April 15, 1941.    E. KRAMAR ET AL    2,238,270
RADIO DIRECTION FINDING SYSTEM
Filed Jan. 24, 1939    2 Sheets-Sheet 1

Inventors:
Ernst Kramar
Heinrich Nass
by
Attorney

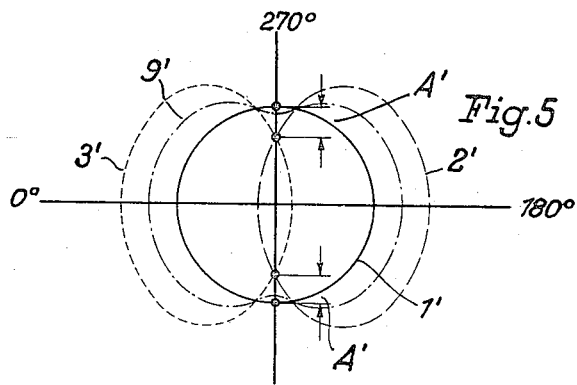
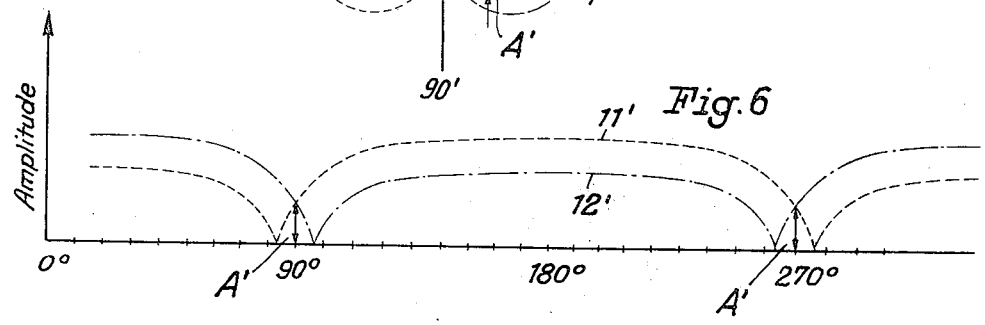
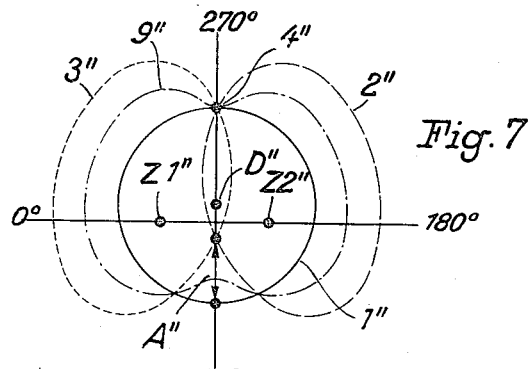
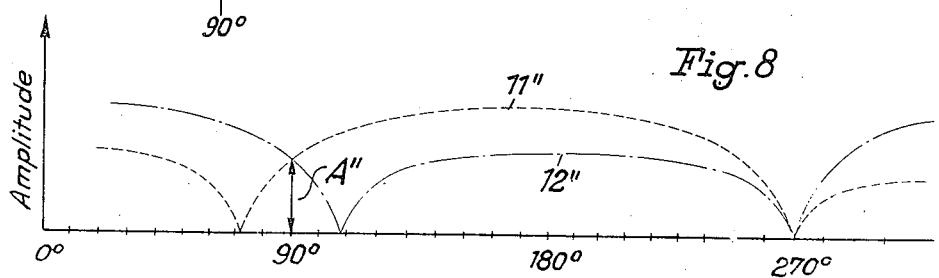

Patented Apr. 15, 1941

2,238,270

UNITED STATES PATENT OFFICE 2,238,270

RADIO DIRECTION FINDING SYSTEM

Ernst Kramar and Heinrich Nass, Berlin, Germany, assignors to C. Lorenz Aktiengesellschaft, Berlin-Tempelhof, Germany, a company Application January 24, 1939, Serial No. 252,522
In Germany November 30, 1938

2 Claims. (Cl. 250—11)

The present invention relates to radio direction finding systems, and more particularly to improvements in arrangements for producing guiding course lines.

It is a well known method to obtain guiding course lines by means of radio transmitting systems operating on the amplitude comparison principle, according to which the transmitter continually energizes a radiating antenna, the resultant radiation diagram of which is influenced by additional antenna means being alternately rendered effective and ineffective in rhythm with complementary signals, such as dots and dashes, or the Morse code signals A and N, for example.

The present invention consists in certain features of novelty which are pointed out in the appended claims and which will be readily understood from the following description, reference being made to the accompanying drawings, in which—

Figures 1, 3:
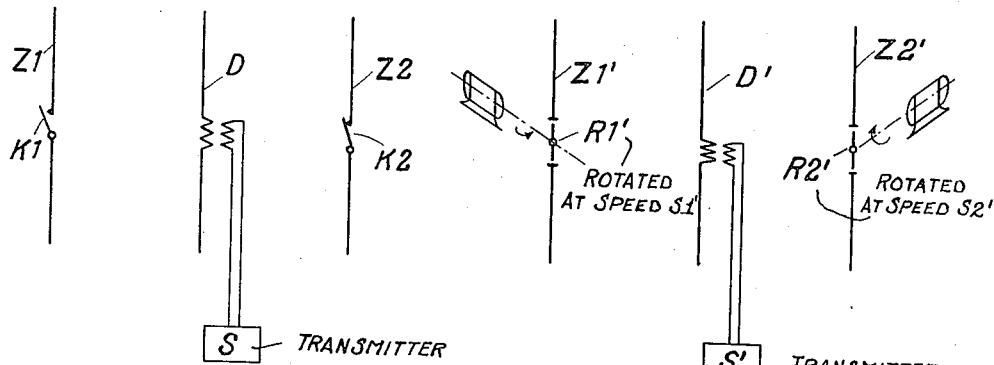
Figure 2:
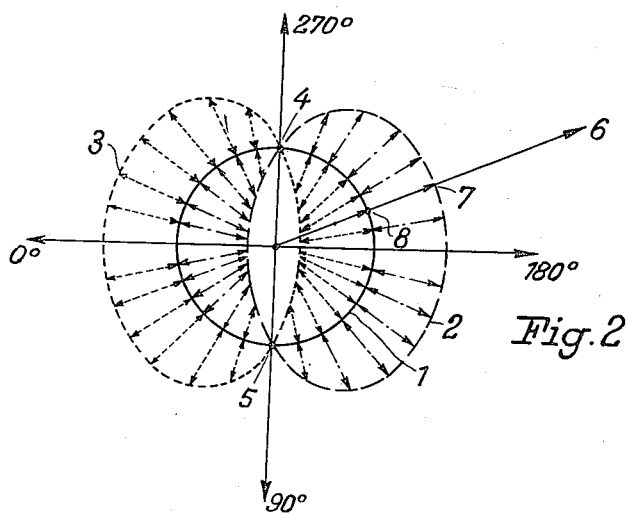
Figure 4:
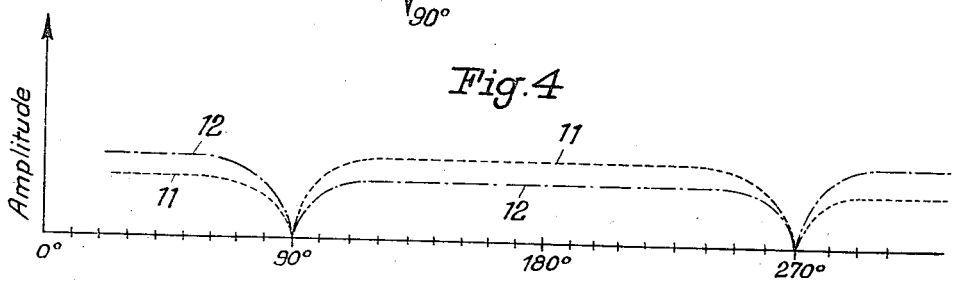

Fig. 1 schematically shows a known transmitting system, Fig. 2 illustrates a radiation characteristic of such system, Fig. 3 schematically shows a transmitting system according to the present invention, Fig. 4 is a graph relating to Fig. 2, Fig. 5 shows the radiation characteristics as obtained by the arrangement shown in Fig. 3, Fig. 6 is a graph relating to Fig. 5, Fig. 7 illustrates an improved transmitter arrangement and the resulting radiation characteristics, while Fig. 8 is a graph relating to Fig. 7.

Referring first to Fig. 1 which schematically illustrates a known transmitter system, the radiating vertical dipole D is continually fed from the transmitter S. Additional dipoles Z1 and Z2 which act as reflectors are located on either side of said radiating dipole. Each of said additional dipoles or reflectors Z1 and Z2 is provided with a contact K1 and K2, respectively, by means of which the reflectors are alternately rendered effective and ineffective so as to set up directional radiation patterns which intersect each other and the amplitudes of which are compared with one another. The radiation patterns thus obtained are diagrammatically shown in Fig. 2. The radiation diagram produced by the emitting dipole D during the ineffectiveness of both additional antenna means or reflectors Z1 and Z2 is marked by reference numeral 1. When the additional antenna means Z1 becomes energized, the coaction between this means and the emitting dipole D produces the radiation pattern 2, while the effectiveness of the other additional antenna means Z2 in cooperation with the emitting dipole D produces the radiation pattern 3.

The above described transmitter system is operated in such manner that the two reflectors are alternately rendered effective and ineffective in rhythm with mutual supplemental or complementary signals, such as the Morse code signals A and N, or dots and dashes, which are compared with one another in the receiving station. When the radiation patterns resulting from this operation involve equal amplitudes, the complementary signals amalgamate to a continuous dash note which is employed for course line indications. Other types of radio transmitter systems are also known, which likewise operate on the basis of amplitude comparison for obtaining guiding course lines. However, the mutually intersecting radiation characteristics set up in accordance with this last mentioned type of transmitter systems are not alternately keyed in rhythm with complementary signals, but are individually modulated with different modulation frequencies independently of one another. This method involves the advantage over the keying principle, which latter principle is particularly well adapted for an audible reception, that a visible indication with respect to the course line may be effected by means of indicating instruments with relatively simple expenditures.

The present invention deals with certain problems concerning the last mentioned method of modulating the radiation patterns with different frequencies by means of radio transmitting systems of the heretofore described type which, as a matter of fact, operate rather satisfactorily in practical use. These problems are solved in accordance with the main feature of the present invention by equipping the additional antenna means with interrupter devices which are thus adapted to replace the keying contacts of the known radio transmitting systems.

A transmitter arrangement of the last mentioned kind is schematically shown in Fig. 3. The radiating dipole D' is continually fed from the transmitter S', while the additional antenna means Z1' and Z2' positioned on either side of said dipole are equipped with interrupter devices R1', R2', respectively. These interrupter devices may, for instance, be motor-driven rotatable switches, the revolution speed of each switch being determined in accordance with the modulation frequency with which the appertaining additional antenna means is to be operated. These switches may either be galvanic, capacitive or inductive devices, that is, either rotating switches, rotating condensers or rotating variometers. For example, if the radiation diagram 2 of Fig. 2 shall be modulated with a frequency of 150 cycles per second, while it is desired to modulate the diagram 3 with a frequency of 90 cycles per second, the interrupter device R1' is to be driven at a speed of 150 revolutions per second and the device R2' at a speed of 90 revolutions per second. The difference between the amplitude of the initial radiation diagram in a state of ineffective additional antenna means, and the amplitudes of the radiation patterns obtained by virtue of the coaction between the continually fed radiating antenna and the said additional antenna means is, according to a further feature of the invention, utilized as the modulation amplitude.

It has been found in connection with transmitter systems according to Fig. 2 that modulation exists laterally with respect to the course line, but that there is no modulation in the direction of said line. As a matter of fact, the amplitude in the direction as, e. g., indicated in Fig. 2 by the arrow 6 changes from value 7 to the value 8 when the interrupter devices of the additional antenna means are operated. In other words, are amplitude difference between the diagram 1 and the diagram 2 acts as modulation amplitude. However, in the direction of the course line as defined by amplitude equality, there is no amplitude difference between the diagrams 1, 2, and 3 since these diagrams pass through the points 4 and 5 of intersection common thereto, from which follows that the modulation is nil in the direction of the course line. The dash-dotted lines shown in Fig. 2 indicate the modulation amplitude values of the frequency of 150 cycles per second, while the dotted lines represent the values of the modulation amplitude of the frequency 90 cycles per second. These amplitudes of the modulation frequencies are plotted against the direction as shown in Fig. 4, in which the curve 11 represents the modulation frequency of 90 cycles per second, and the curve 12 represents the modulation frequency of 150 cycles per second. Both modulation frequencies are zero in the direction of the course line, that is, at 90 degrees and at 270 degrees.

This disadvantage is eliminated according to a further feature of the invention by so dimensioning the radio transmitter system that an amplitude difference between the continuous diagram of the emitting dipole on the one hand and the diagrams obtained by the additional antenna means on the other hand also exists in the direction of the course line obtained by virtue of amplitude equality of said diagrams.

This arrangement is more precisely shown in Fig. 5. The non-directional radiation diagram produced by the continually fed radiating dipole D' of Fig. 3 is denoted 1', while reference numerals 2' and 3' indicate the diagrams obtained as a result of the cooperation between the said dipole D' and the additional antenna means Z1' and Z2' of Fig. 3. It will be readily seen from the Fig. 5 that there is an amplitude difference A' between the diagram 1' and the diagrams 2' and 3' in the direction of the course line radiation, and this difference is employed as amplitude of modulation in the course line direction. In the Fig. 6 the individual modulation amplitudes are plotted against the angular direction relative to that of the course line and the modulation amplitude in this direction is likewise denoted in this figure by letter A'. The curve 11' represents the modulation frequency of 150 cycles per second of the radiation diagram 3' of Fig. 5, while the curve 12' corresponds to the modulation frequency of 90 cycles per second of the diagram 2' of Fig. 5.

A further improvement is attained in this respect by means of an arrangement shown in Fig. 7. The radiation dipole and the additional antenna means which in accordance with the embodiment of Fig. 3 are positioned in linear relation to one another, are here arranged in the corners of an isosceles triangle. In the Fig. 7, D'' is the continually energized radiating dipole, while Z1'' and Z2'' represent the additional antenna means. The diagrams 2'' and 3'' of this arrangement are slightly inclined against each other and intersect one another and likewise the diagram 1'' at a point 4'' in the direction of 270 degrees. Consequently, no modulation will be perceived in this direction. In the opposite direction, that of 90 degrees, however, there is a great amplitude difference A'' which permits a strong modulation to be effected. This embodiment of the invention involves the advantage that a modulation of almost 100 per cent may be impressed upon the course line radiation in one single radiation direction only. The corresponding amplitudes of modulation are shown in the Fig. 8 in which the amplitudes are plotted relative to the direction. The curves 11'' and 12'' which correspond to the diagrams 3'' and 2'', respectively, show a strong amplitude difference A'' in the direction of 90 degrees, while the modulation is nil in the opposite direction corresponding to 270 degrees.

The heretofore described novel method of modulation involves the further essential feature that the radiation of the high frequency transmitter may simultaneously be modulated with communications, such as spoken messages, by means of which directions or orders may be transmitted to the pilot of a vehicle obtaining the necessary navigation signals for the radio beacon under consideration. As a result of the modulation of the radiation diagrams according to the feature of the invention, a mean value of the frequency carrier is obtained, the diagram of which is shown at 9' of Fig. 5 and at 9'' of Fig. 7 in dash-dotted lines. The diagram of this high frequency carrier is almost non-directional and may be used for propagating the message modulation into all directions. The single measure required in this connection is that the frequencies which correspond to the diagram modulating frequencies must be suppressed in the message frequency, that is, the speech frequency band. This may be effected by means of filters. Consequently, in the embodiment heretofore described, the frequencies of 90 and 150 cycles per second must be suppressed in the speech frequency band.

The present invention is by no means limited to systems in which the continually energized radiation antenna system and the additional antenna means are dipoles as shown in the embodiments heretofore described. On the contrary, the invention is applicable to systems in which not only the first mentioned system but also the last mentioned means consist of a plurality of individual dipoles which separately involve certain directional effects. In such cases the initial diagram 1' of Fig. 5 and 1'' of Fig. 7 will not be circular, but will have any other configuration, in other words, this diagram may be elliptical or club-shaped, for example. Moreover, the invention is applicable not only to systems in which the additional antenna means are energized by radiation from the transmitter, but also to systems in which said additional means are directly fed from said transmitter.

What is claimed is:

1. In a radio transmitting system for obtaining course lines by amplitude comparison between radiation diagrams which are modulated independently of one another by different modulation frequencies, a first antenna system, a transmitter continually feeding said first antenna system for producing a non-directional radiation diagram of given amplitude, additional parasitically energized antenna systems in cooperation with said first antenna system for producing with said first antenna system further radiation diagrams intersecting each other and also intersecting said non-directional diagram and extending therebeyond in at least one direction, and means for rendering each of said additional antenna systems effective in different rhythm to produce different modulation frequencies of predetermined amplitude, the resulting difference between the amplitude of said non-directional radiation diagram and the amplitudes of said further radiation diagrams resulting from said cooperative relationship between said first antenna system and said additional antenna systems producing the indicating modulation amplitude.

2. In a radio transmitting system for obtaining course lines by amplitude comparison between radiation diagrams which are modulated independently of one another by different modulation frequencies, a first antenna system, a transmitter continually feeding said first antenna system for producing a non-directional radiation diagram of given amplitude, additional parasitically energized antenna systems physically displaced with respect to said first antenna system in the corners of an isosceles triangle and cooperatively allotted thereto for producing with said first antenna system further radiation diagrams extending beyond said non-directional diagram in at least one direction, and means for rendering each of said additional antenna systems effective in different rhythm to produce different modulation frequencies of predetermined amplitude, the spacing of said antenna systems being such that said further radiation diagrams are dimensioned to intersect one another and also to intersect the said non-directional diagram in a single point which in one direction of radiation is common to all diagrams, while the intersecting point between said further radiation diagrams is remotely spaced from the boundary of said non-directional diagram in the opposite direction of radiation, the amplitude difference thus occurring in the last mentioned direction of radiation between said non-directional radiation diagram produced during the ineffectiveness of said additional antenna systems and said further radiation diagrams produced as a result of the joint action of said first and said additional antenna systems forming the indicating modulation amplitude.

ERNST KRAMAR.
HEINRICH NASS.